United States Patent [19]

Hoppe

[11] Patent Number: 5,669,867
[45] Date of Patent: Sep. 23, 1997

[54] MACHINE TOOL

[75] Inventor: Gerd Hoppe, Habichtswald, Germany

[73] Assignee: Deckel Maho GmbH, Pfronten, Germany

[21] Appl. No.: 572,167

[22] Filed: Dec. 13, 1995

[30] Foreign Application Priority Data

Dec. 14, 1994 [DE] Germany .......................... 44 44 614.4

[51] Int. Cl.⁶ ................... B23Q 3/157; B23Q 1/25; B23C 1/14
[52] U.S. Cl. .................. 483/55; 29/33 P; 408/234; 409/168; 409/224; 409/235
[58] Field of Search ..................... 483/56, 30, 54, 483/55; 29/33 P, 56.5, 38 A, 38 B; 409/219, 221, 223, 224, 222, 235, 198, 197, 163, 164, 165, 168; 408/234, 237

[56] References Cited

U.S. PATENT DOCUMENTS

| 1,384,079 | 7/1921 | Melling ......................... 409/168 |
| 3,203,314 | 8/1965 | Ried ............................. 409/168 |
| 3,361,033 | 1/1968 | Müller .......................... 409/168 |
| 3,822,959 | 7/1974 | Tabard ....................... 409/224 X |
| 3,998,127 | 12/1976 | Romeu ....................... 408/234 X |
| 4,369,958 | 1/1983 | Maynard ....................... 269/61 |
| 4,644,635 | 2/1987 | Murai et al. ..................... 483/54 |
| 4,664,570 | 5/1987 | Tsukiji et al. ................... 409/84 |
| 4,951,376 | 8/1990 | Grund . |
| 5,172,464 | 12/1992 | Kitamura et al. ............. 29/33 P X |

FOREIGN PATENT DOCUMENTS

| 2833145 | 2/1980 | Germany . |
| 3590093 | 9/1985 | Germany . |

*Primary Examiner*—William R. Briggs
*Attorney, Agent, or Firm*—Baker, Maxham, Jester & Meador

[57] ABSTRACT

A machine tool for multiaxial machining of a workpiece in a chuck. Both horizontal and vertical motion are provided. Even greater efficiency can be achieved by properly positioning tool magazines and providing at least two work stations in adjacent relationship.

16 Claims, 3 Drawing Sheets

MACHINE TOOL

BACKGROUND

1. Field of the Invention

This invention generally concerns machine tools and more particularly relates to a machine tool for multiaxial machining of at least one work piece in a chuck, the machine tool providing both horizontal and vertical movement for efficient operation.

2. Discussion of the Related Art

A fundamental problem in machining workpieces is how to perform several machining operations in different coordinates and in different areas of the workpiece using either the same or different tools in order to achieve a greater precision in machining while at the same time avoiding the necessity of rechucking the workpiece on the work bench. The known universal milling, drilling and boring machines and similar machining centers have been developed for machining workpieces on the basis of these factors. These machines typically have one vertical and one horizontal drilling and milling head which can be alternately brought to the operating position on the spindle head and permit machining of the workpiece in several coordinates without rechucking the workpiece. In addition, there are also known machine designs where a single milling head is mounted on a swivel console that is in turn mounted on the face of a spindle housing and permits pivoting of the working spindle into a vertical position, a horizontal position and various inclined intermediate positions. Finally, there are also known cutting machine tools where motor-driven work tables (turntables) which rotate about a center axis are mounted on special consoles that have a mechanism for swiveling the work table about a horizontal coordinate and are mounted on the face of the machine column in such a way that they can be adjusted vertically. These known models have a complicated design and consequently require a high investment and high operating costs. In addition, when there are high demands for machining accuracy, problems may occur due to a reduced rigidity because of the multitude of pairs of guides and mounting points, including the corresponding fastening devices.

German patent publication 2,833,145 discloses a horizontal milling machine with a bed design, where a machining unit is mounted on the rear face of a relatively long, dimensionally stable machine bed whose horizontal motor-driven working spindle can be moved in both vertical and horizontal coordinates. A table construction is mounted on the top of the bed in such a way that it can be driven in a horizontal coordinate. It also has a special table base with a surface that is inclined down toward the machine column and has a supporting console for the work table mounted on it so it can be driven about the center axis. Since the machining unit is arranged on the narrow rear side of the elongated bed, this machine tool takes up a great deal of space. In addition, the height of the chucking surface of the work table is a disadvantage, having a very negative effect on accessibility, especially for chucking workpieces that have a complex design. Finally, there are problems with the resulting chips, which may be deposited on the horizontal surfaces of the bed and the guides.

German patent publication 3,590,093 discloses a vertical milling machine with a double column design, where a vertical spindle head is mounted by means of a console so it can be driven on a cross bar, where this cross bar can be motor driven on the top guide rails of the two machine columns. Between the two machine columns there is a supporting structure for a work table that can be pivoted about a horizontal axis. A drive unit for rotating the work table about its vertical axis is provided in the lower part of this supporting structure. With this machine there is also the problem that it is relatively difficult to chuck workpieces on the work table located between the two machine columns and has previously been positioned in its horizontal plane. In addition, precision machining of workpieces is impossible with the table in an inclined or vertical position, because the forces that occur in machining can cause shifting of the work table, which is held more or less by suspension in the inclined position.

Finally, U.S. Pat. No. 4,644,635 describes a machining center for vertical machining of workpieces which again uses a double-column design, where a vertical milling head with a built-in machining spindle is mounted on one face of an upper cross bar in such a way that it can be motor driven in several axes. There is a table construction located between two columns on the base shared by these two columns. This table construction can be driven horizontally on the base in elongated guide rails and has a console with a supporting surface with a 45° slope. A table support with a triangular cross section is mounted on this console so it can be rotated about an axis normal to the 45° supporting surface, so that a table top arranged on the larger side of the support can be brought from a horizontal position to a vertical position and vice versa by a half rotational movement of the table support. This known machine also requires a great deal of space and has the additional disadvantages of a high manufacturing cost and the difficulty of disposing of the chips.

SUMMARY OF THE INVENTION

A major purpose of this invention is to create a machine tool that has a relatively simple design and requires only a small amount of space and permits very accurate machining of workpieces due to its great inherent rigidity, in just one chucking position.

This purpose is achieved according to this invention by the fact that the front face of the machine column is provided with a recess whose bottom, which is inclined downward at the front at a 45° angle, forms a support for a mounting console of the work table, where the mounting console has a foot with a circular cross section as seen from above and a supporting surface of the shoulder that forms an angle of 45° to the axis of rotation of the mounting console.

The special arrangement of the mounting console in a recess with an inclined bottom that is provided specifically for this purpose on the front side of the machine column leads to several practical advantages that cannot be achieved with any known machine design. One very important advantage consists of the good accessibility of the work table in its horizontal position, which greatly facilitates the introduction and removal of the workpieces and chucking them on the work table as well as making it easier to observe the individual machining operations. Another advantage is the extremely rigid and very compact design of the machine as a whole, which makes it possible to set up the machine in a very small amount of space in a machine room and also permits an extremely high machining accuracy. This advantage is achieved due to the recess with the inclined bottom that is offset into the machine column. In addition, the technical concept implemented according to this invention leads to a great reduction in the required number of individual parts by about two-thirds in comparison with traditional swivel head machines for five-axis machining of workpieces. Finally, the design and arrangement of the table console according to this invention yields the enormous practical advantage that it is especially easy to remove the chips because the chips generated in machining and also the rinsing fluid can run down freely, thus preventing a build-up of deposits on the guide surfaces and/or friction surfaces.

Thanks to this invention, the work table can be adjusted quickly from a horizontal position to a vertical position and can be secured accurately and with stability in each of these end positions and also in intermediate positions through the use of suitable fastening devices in the form of chucking elements, centering pins and/or position-controlled motors, as examples. This requires only that the console be rotated by 180° in the support, which is preferably designed as a ring, that the fastening devices be activated in the end position, and that the self locking braking effect of the motor be utilized. It is especially advantageous for an automated process that workpieces, optionally mounted on pallets, can be transferred in automatic motion cycles to the work table, which has previously been brought to its horizontal position, and clamped there, whereupon the work table can be moved into its vertical position by means of a simple controlled swiveling movement of the console. These movements are completed within a very short period of time, so the dead time of the machine tool can be further reduced.

In addition to advantageous space requirements, the arrangement of the work table according to this invention also has the advantage in comparison with traditional console machine tools with consoles mounted on the face so they are more or less suspended there, that the entire console designed according to this invention is supported with its lower face in such a way that the weight of the console itself, the work table and the workpiece and finally also the loads that occur in machining, are transmitted as compressive forces through the foot of the console over a large area in the machine foundation, in other words, in the machine column. This effect is promoted by a snug fit of the foot of the console, for example, on a ring-shaped supporting part which can also be designed as a guide for the rotation of the console about its center axis. Traditional drive units such as hydraulic motors or electric motors with or without gears can be used for driving the console about its rotational and central axis. The work table may be secured, not only in its horizontal and vertical end positions, but also in intermediate positions in order to be able to execute the respective machining operations on the workpiece. A stepping motor or an NC4 drive motor receives appropriate control commands from the program control unit and contains an effective automatic lock, optionally by means of an internally prestressed gear by means of which the work table can be secured reliably and with high accuracy in its given operating position without any other fastening devices. The drive units may be mounted either in the column or the foot of the console.

The console's special design has a particular technical importance. It allows the achievement of a more or less constant working range with a horizontal as well as with a vertical work table. For this purpose, the console possesses a foot with a circular cross-section, as seen from above, and a supporting shoulder mounted on the side of the rotation axis, whose flat surface supports the work table and forms a 45° angle with the rotation axis. The size and shape of this attachment have been chosen so the work table is always located on the side of the rotation axis. This arrangement of the work table in conjunction with the special console design achieves the intersection of the center axis of the work table, designed mainly as a motor-driven turn table, with the console's rotation axis at a point independent from the respective rotational position of the console.

A further aspect of this invention is a two table construction, designed according to the invention, which can be mounted on a single, suitably widened machine column. The workpieces are anchored on the two work tables and can be machined in succession by the single vertical spindle through adequate movement of the machining unit. This design further allows that a workpiece be chucked workpiece on one work table while machining a second chucked workpiece on the other work table. In order not to disrupt the execution of the high precision chucking of one workpiece, a protective wall can be provided which can be mounted effectively either on the machine column or on another fixed part so as not to hinder the movements of the milling head.

BRIEF DESCRIPTION OF THE DRAWING

The objects, advantages and futures of this invention will be more readily perceived from the following detailed description, when read in conjunction with the accompanying drawing, in which.

DETAILED DESCRIPTION OF THE PREFERRED EMBODIMENTS

Figure 1A:
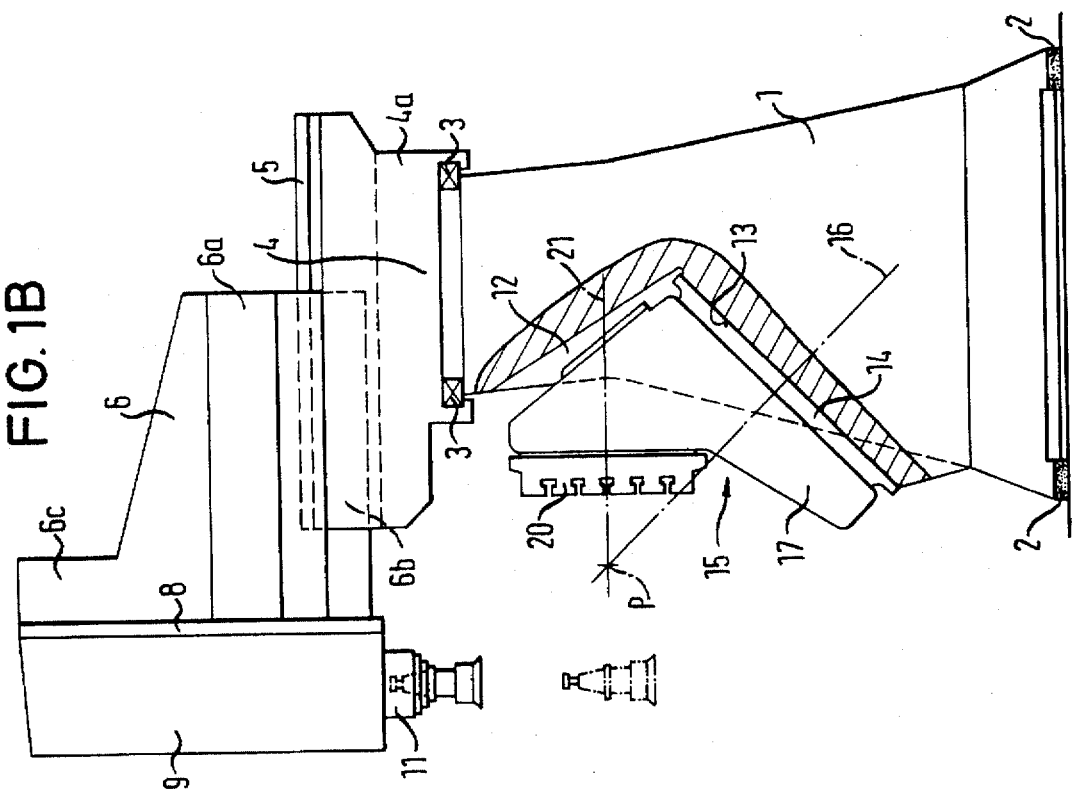
FIGS. 1A and 1B show a schematic side view of a combined milling and boring machine with the work table aligned horizontally and vertically, respectively.

The machine tool illustrated here by way of an example of the invention is a program-controlled combined milling and boring machine for automated multiaxial machining of workpieces and has a work table supported directly on a stationary, dimensionally stable machine column. According to the schematic diagrams in FIGS. 1A and 1B, the combined milling and boring machine has dimensionally stable machine column 1 that stands upright on the floor of the building or on a foundation by means of feet 2 that are optionally adjustable. Guide rails 3 running at a right angle to the plane of the drawing are mounted permanently on the top of machine column 1 so a motor-driven cross slide 4 can be guided on the rails. This cross slide consists of continuous center part 4a and two side walls 4b (FIGS. 2 and 3) with guide rail 5 mounted on the top of each so they run horizontally in the plane of FIG. 1A. Saddle slide 6 runs on guide rails 5 by means of side guides 6a, where the center part 6b of saddle slide 6 projects between two walls 4b of cross slide 4. The saddle slide has elongated top part 6c and on its face it has vertical guide elements 8 on which a vertical motor-driven spindle housing 9 can be guided as a machining unit. Spindle housing 9 contains a drive motor (not shown) for working spindle 11. Slides 4 and 6 described above as well as spindle housing 9 can be driven in their respective axes by means of control drives (not shown) or caster spindles.

Recess 12 with arched peripheral wall 12a (see FIG. 2) and flat bottom 13 inclined toward the lower front at an angle of 45°, is provided on the front face of the machine column. Internal reinforcements (not shown) that run in the direction of bottom 13 and impart a high positional rigidity are provided in the machine column. On bottom 13 there is support 14 on which console 15 is supported so it can be rotated about center axis 16 of the support by means of a drive unit (not shown). In the embodiment illustrated in FIGS. 1 and 2, console 15 has circular foot 17 as seen from above, and supporting shoulder 18 designed in one piece with foot 17, running approximately parallel to and beside center axis 16 and having supporting surface 19 that runs at an angle of 45° to the center axis. A work table is mounted on supporting surface 19 of supporting shoulder 18 and is designed as a rotationally driven turntable in the embodiment illustrated here. Center axis 21 of turntable 20 always intersects the axis of rotation and center axis 16 of support 14 and console 15 at point P, regardless of the rotational position of console 15 or the swivel position of work table 20.

Figure 1B:
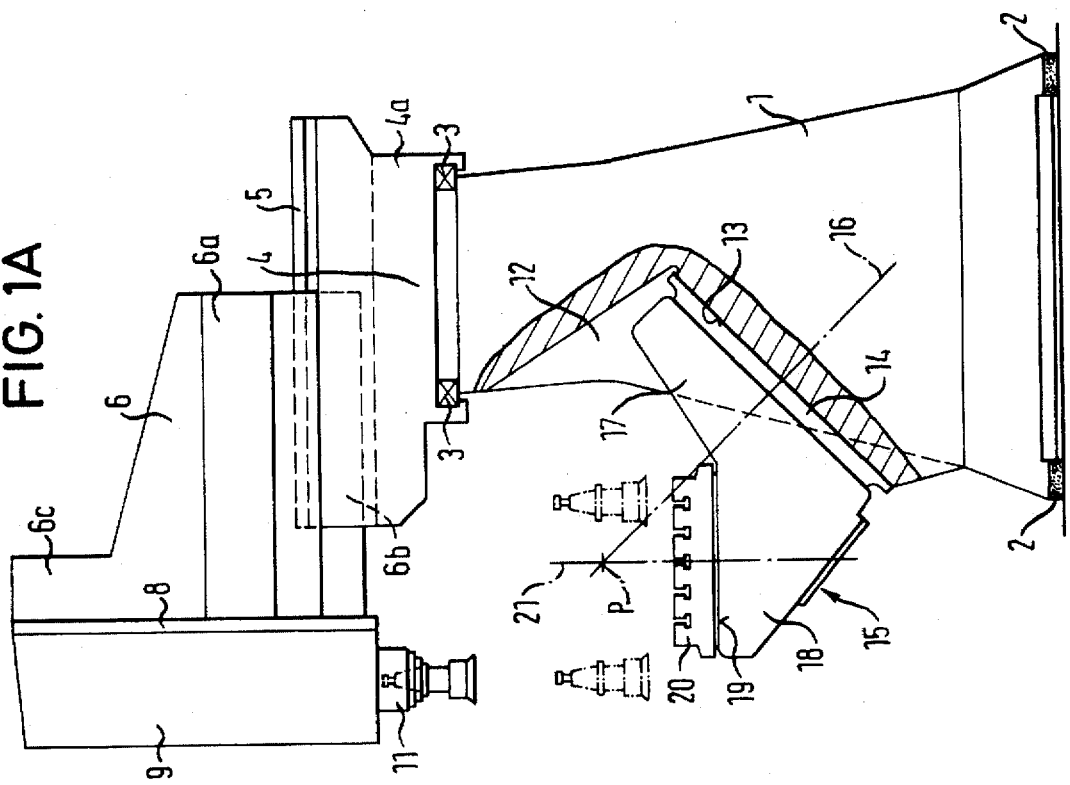
Figure 2:
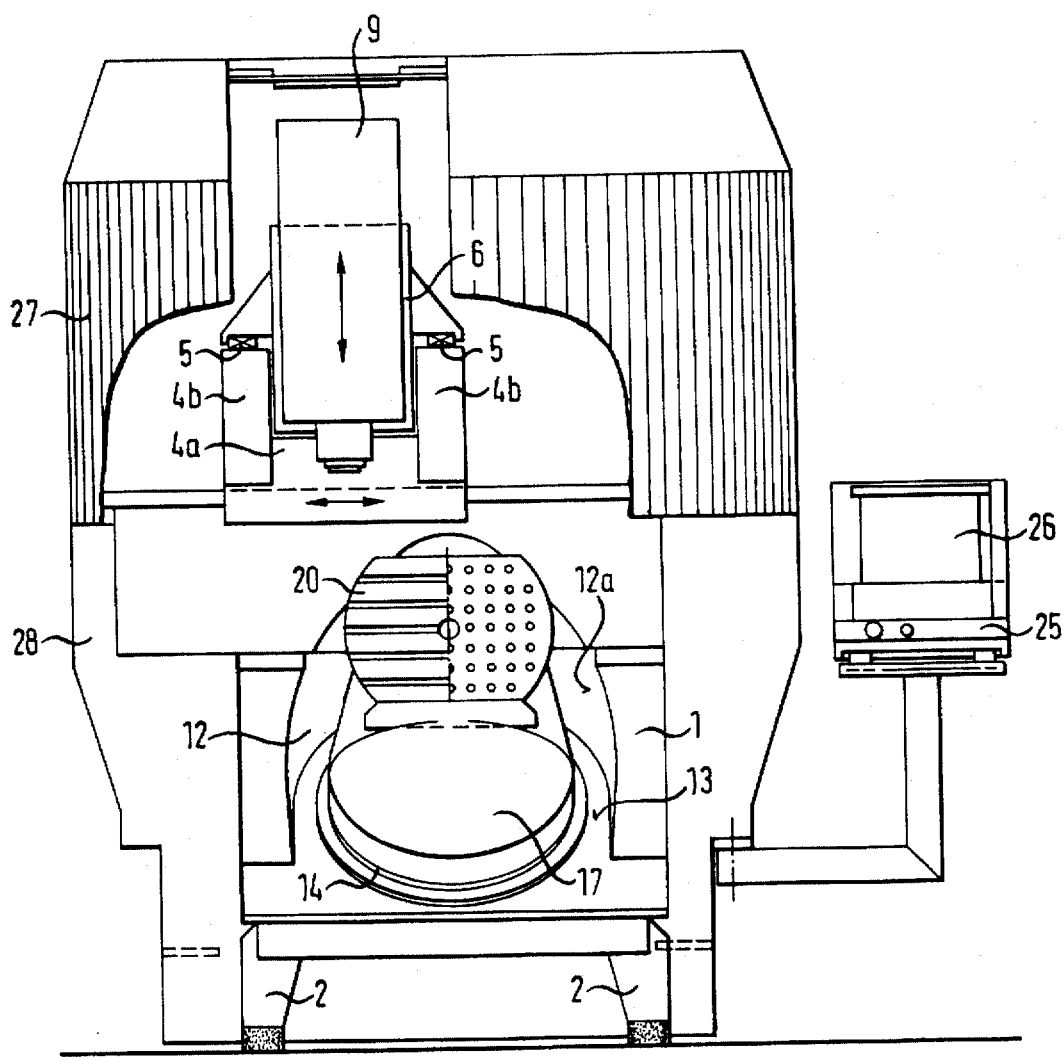
FIG. 2 shows a front view of the combined milling and boring machine according to FIG. 1 with additional details.

As shown in FIG. 2, the combined milling and boring machine illustrated here is provided with a program control unit that can be connected to a central computer or has a separate computer and whose programming is also performed by means of input panel or keyboard 25 with display screen 26. The working space is closed off by lameliar curtain 27 on the machine side and by cab enclosure 28 with windows and doors on the operator's side. As shown especially in FIGS. 1A and 1B, the machine tool illustrated here can be used to machine workpieces with vertical spindle 11 in the position shown in FIG. 1A—in other words, with a horizontal work table 20—and also in the position according to FIG. 1B, that is in the vertical position of the work table. Due to the arrangement of the work table and its supporting console 15 that are set back in the column recess 12, this yields a comparatively great working range with saddle slide 6 that projects a relatively short distance beyond the column construction. In addition to the end positions shown here, machining can also be performed with the workpiece in intermediate positions—in other words, in inclined positions. With an appropriate design of the drive unit for supporting console 15 and the control unit, machining operations can also be performed during the pivoting movement of this supporting console, which leads to completely new possible applications, for example, finishing or polishing crowned surfaces. Using rotationally driven turntable 20 as the work table yields additional possible variations in machining workpieces. Experience has shown that by far the majority of machining operations are carried out with the vertical spindle on a workpiece chucked on a horizontally aligned work table, so the vertical forces exerted on the workpiece during machining and in the work table are transmitted through console 15 and inclined support 14 into the extremely rigid machine column in a very favorable manner in these machining operations as illustrated in FIG. 1A.

For a smooth machining process involving several different machining operations, it is especially advantageous that the work table can be adjusted from the position illustrated in FIG. 1A into the vertical position according to FIG. 1B by means of a simple half turn of console 15 without any fundamental change in the geometric relationship, because the center axes 16 and 21 of console 15 and work table 20 still intersect at point P without any change in the two positions.

Figure 3:
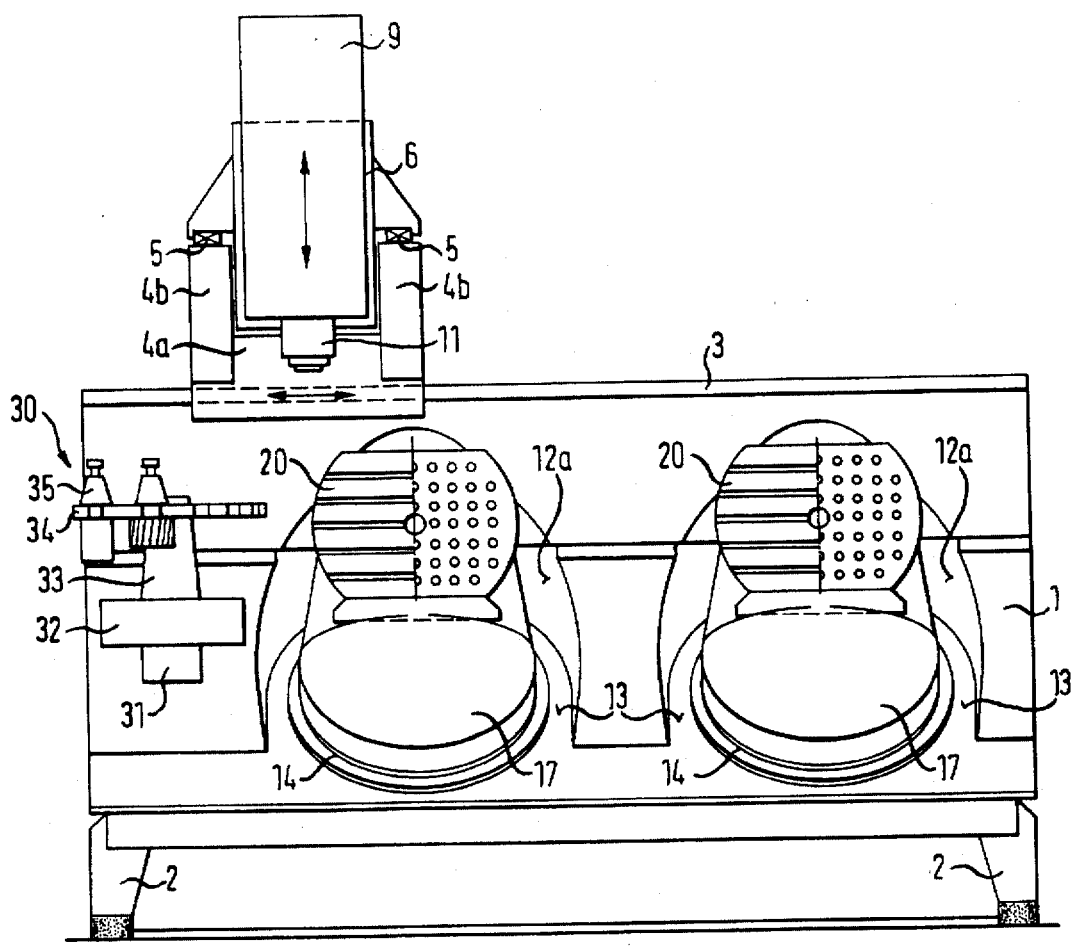
FIG. 3 is a schematic diagram of a combined milling and boring machine with two work tables mounted side by side on the front.

The basic design of the machine tool according to FIG. 3 corresponds to the machine design shown in FIGS. 1 and 2, which is evident by the fact that the corresponding parts are labeled with the same key numbers. Differences, however, include the elongated machine column and the fact that two table constructions are provided in the embodiment that is described in detail with reference to FIGS. 1 and 2, where these two table constructions are arranged with a given distance between them in the front of the machine column. Each of these table constructions, including the respective recess 12 with inclined bottom 13, corresponds to the embodiment described with reference to FIGS. 1 and 2.

In addition, FIG. 3 also shows a tool magazine at the left end of the machine column, which may of course also be provided with a machine according to FIGS. 1 and 2. In order to obtain an adequate number of tool storage sites, two such disk magazines 30 are preferably mounted one after the other as seen in the direction of the figure on a joint supporting string 31 that projects freely into the front space and whose rear end is attached to the front wall of machine column 1. Each magazine 30 has base 32 to accommodate a rotational drive and dimensionally stable column 33 at whose top end magazine disk 34 is mounted so it can rotate. The arrangement and design of the two tool magazines 30 makes it possible to change individual tools 35 directly in the working spindle without requiring any special tool changer, and spindle 11 executes all the movements necessary for a tool changing operation.

This invention is not limited to the embodiments discussed here but can also be applied to other types of machinery where the possibility of multiaxial machining of workpieces is required. This is true, for example, of grinding machines, cutting machines that work with beams of energy, electrical discharge machines and comparable machining centers. In addition, it may be advantageous in special cases to provide two work tables on the top of the console with an appropriate design of supporting shoulder 18, in which case one work table will be positioned on one side of the axis of rotation and the second work table will be positioned on the other side. Then the top of the console may be either continuously flat so that both work tables lie in the same plane or the top of the console may be offset at a right angle with the center point on the axis of rotation, so one work table can be mounted on each side.

In view of the above description, it is likely that modifications and improvements will occur to those skilled in the relevant technical field which are within the scope of this invention. Accordingly, the invention is limited only by the spirit and scope of the appended claims.

What is claimed is:

1. A machine tool for multiaxial machining of a workpiece in a chuck, said machine tool comprising:
   a dimensionally stable machine column having a recess on one side thereof, said recess being formed with a bottom surface inclined downward toward the front at a 45° angle to form a support;
   a supporting console pivotably mounted on said support, said supporting console having an axis of rotation and having a circular cross-section foot and a supporting shoulder, said supporting shoulder having a supporting surface oriented at a 45° angle with respect to said axis of rotation;
   a work table mounted to said supporting surface of said console;
   a cross slide horizontally movably mounted on said machine column;
   a vertical milling head vertically movably mounted on said cross slide; and
   a programmable control unit coupled to said machine tool elements for the operation of the various functions of said machine tool.

2. The machine tool recited in claim 1, wherein said supporting console is motor driven and can be secured in pre-selected operating positions of said support.

3. The machine tool recited in either claim 1 or 2, wherein said recess has an arch-shaped top wall, said supporting shoulder of said console has an arched outside face that is fitted to the shape of said top wall of said recess when said work table is in the vertical position.

4. The machine tool recited in either claim 1 or 2, wherein said supporting console is formed with a supporting surface on said support, said console supporting surface being larger by a factor of at least two than said supporting surface of said supporting shoulder to which said work table is mounted.

5. The machine tool recited in claim 3, wherein said supporting console is formed with a supporting surface on said support, said console supporting surface being larger by a factor of at least two than said supporting surface of said supporting shoulder to which said work table is mounted.

6. The machine tool recited in either claim 1 or 2, and further comprising at least one tool magazine in a disk design which is arranged next to said recess on the front side of said machine column.

7. The machine tool recited in claim 3, and further comprising at least one tool magazine in a disk design which is arranged next to said recess on the front side of said machine column.

8. The machine tool recited in claim 4, and further comprising at least one tool magazine in a disk design which is arranged next to said recess on the front side of said machine column.

9. The machine tool recited in either claim 1 or 2, wherein said machine column is elongated and is formed with at least two recesses, each said recess having an inclined bottom provided in the front side of said machine column, each said recess having a said support, a said supporting console having an axis of rotation, a said circular foot, a said supporting shoulder, a said supporting surface oriented at a 45° angle with respect to said axis of rotation, and a said work table mounted on said supporting surface.

10. The machine tool recited in claim 3, wherein said machine column is elongated and is formed with at least two recesses, each said recess having an inclined bottom provided in the front side of said machine column, each said recess having a said support, a said supporting console having an axis of rotation, a said circular foot, a said supporting shoulder, a said supporting surface oriented at a 45° angle with respect to said axis of rotation, and a said work table mounted on said supporting surface.

11. The machine tool recited in claim 4, wherein said machine column is elongated and is formed with at least two recesses, each said recess having an inclined bottom provided in the front side of said machine column, each said recess having a said support, a said supporting console having an axis of rotation, a said circular foot, a said supporting shoulder, a said supporting surface oriented at a 45° angle with respect to said axis of rotation, and a said work table mounted on said supporting surface.

12. The machine tool recited in claim 5, wherein said machine column is elongated and is formed with at least two recesses, each said recess having an inclined bottom provided in the front side of said machine column, each said recess having a said support, a said supporting console having an axis of rotation, a said circular foot, a said supporting shoulder, a said supporting surface oriented at a 45° angle with respect to said axis of rotation, and a said work table mounted on said supporting surface.

13. The machine tool recited in claim 9, and further comprising:
 a common machine hood covering each said recess and work table apparatus; and
 a movable partition provided between each two adjacent recess and work table structures.

14. The machine tool recited in claim 10, and further comprising:
 a common machine hood covering each said recess and work table apparatus; and
 a movable partition provided between each two adjacent recess and work table structures.

15. The machine tool recited in claim 11, and further comprising:
 a common machine hood covering each said recess and work table apparatus; and
 a movable partition provided between each two adjacent recess and work table structures.

16. The machine tool recited in claim 12, and further comprising:
 a common machine hood covering each said recess and work table apparatus; and
 a movable partition provided between each two adjacent recess and work table structures.

* * * * *